United States Patent [19]
Wiegel

[11] Patent Number: 4,747,145
[45] Date of Patent: May 24, 1988

[54] EARCUP SUSPENSION FOR HEADPHONE

[75] Inventor: Christopher D. Wiegel, Minneapolis, Minn.

[73] Assignee: Telex Communications, Inc., Minneapolis, Minn.

[21] Appl. No.: 934,126

[22] Filed: Nov. 24, 1986

[51] Int. Cl.⁴ .............................................. H04M 1/05
[52] U.S. Cl. .................................................... 381/183
[58] Field of Search ...................... 381/183, 187; 2/209

[56] References Cited

U.S. PATENT DOCUMENTS

| | | | |
|---|---|---|---|
| 1,714,377 | 5/1929 | Kiernan | 381/183 |
| 3,908,200 | 9/1975 | Lundin | 2/209 |
| 3,919,501 | 11/1975 | Cech et al. | 381/183 |
| 4,542,803 | 9/1985 | Houng | 381/183 |

FOREIGN PATENT DOCUMENTS

| | | | |
|---|---|---|---|
| 2229966 | 12/1972 | Fed. Rep. of Germany | 381/183 |
| 3207098 | 11/1982 | Fed. Rep. of Germany | 381/183 |
| 3223469 | 5/1983 | Fed. Rep. of Germany | 381/183 |

Primary Examiner—Jin F. Ng
Assistant Examiner—Danita R. Byrd
Attorney, Agent, or Firm—Warren A. Sturm

[57] ABSTRACT

An earcup suspension for a headphone includes a housing, having a vertically oriented slot and stationarily mounted on the lower end of a headband to be disposed over the top of the headphone user, an earcup mounting includes a vertical member slidably extending through the slot in the housing and having a rack surface configured to coact with a similarly configured inwardly biased detenting rack stationarily disposed in the slot whereby the earcup mounting may be adjusted vertically with respect to the lower ends of the headband.

11 Claims, 2 Drawing Sheets

EARCUP SUSPENSION FOR HEADPHONE

BACKGROUND OF THE INVENTION

This invention relates generally to communications headsets and is more particularly directed to a vertically adjustable mounting means for suspending an earcup from the lower end or ends of a headband adapted to be disposed over the top of the head of a headset user.

PRIOR ART

The prior art has recognized the sometimes substantial variations in the dimensions of human head in the development of headsets which provide for adjustably disposing headphone earcups from one or both of the lower ends of a headband adapted to be worn over the top of a head of a communications headset user to accommodate the varying distances from the ends of a headband to the ears of a user so that the earcup may be comfortably and efficiently coupled to the outer ear and the auditory canal.

A number of prior art headphones have utilized headbands that are adjustable in length and which, in effect, telescope together and the length may be adjusted so that earcups suspended from either end of the headband are disposed in a desired position. Typically, a frictional engagement intermediate the slidable portions of the adjustable length headband is utilized to maintain such adjusted position. In another form of headset, the headbands are configured to be of one length and suitable mounting means, including a frictional engagement therefor are used to adjustably position an earcup suspension means in a vertical sense.

The fields in which communications headsets are utilized have imposed demands of increased efficiency, including wearability, and cost reduction for equipment that is intended to be operational over a substantial period of time in an environment that is not conducive to the use of mechanisms which are inefficient, expensive and difficult to fabricate and/or that fail to provide a usable service life under adverse environmental conditions, such as weather and the rigors of physical abuse.

SUMMARY OF THE INVENTION

My invention is comprised of a housing having a vertically oriented slot for non-rotatably receiving a vertically upwardly extending portion of an earcup suspension means that is slidably disposed in the slot. The housing is stationarily disposed on the lower end of a headband and includes a spring-biased detenting means extending into the slot and into detenting engagement with a rack-like surface provided on the upwardly extending portion of the earcup suspending means.

In detail, an interiorly slotted housing is stationarily, non-rotatably mounted on the lower end of a headband with the slot oriented in a vertical direction and includes an interiorly disposed detenting rack that is provided with plurality of transversely extending teeth and is resiliently biased inwardly of the slot. An earcup suspension is provided with a vertically extending member having a rack-like surface configuration of laterally extending teeth of similar configuration to the detenting rack and is slidably, non-rotatably disposed in the slot in the housing with the rack facing the detenting rack to provide for an ease of adjustment in the vertical direction while retaining any position for adjustment under adverse environmental conditions, as, for example, falling from great heights or the physical abuse arising from throwing a headset into a box or across a room.

DESCRIPTION OF A PREFERRED EMBODIMENT

Figure 1:
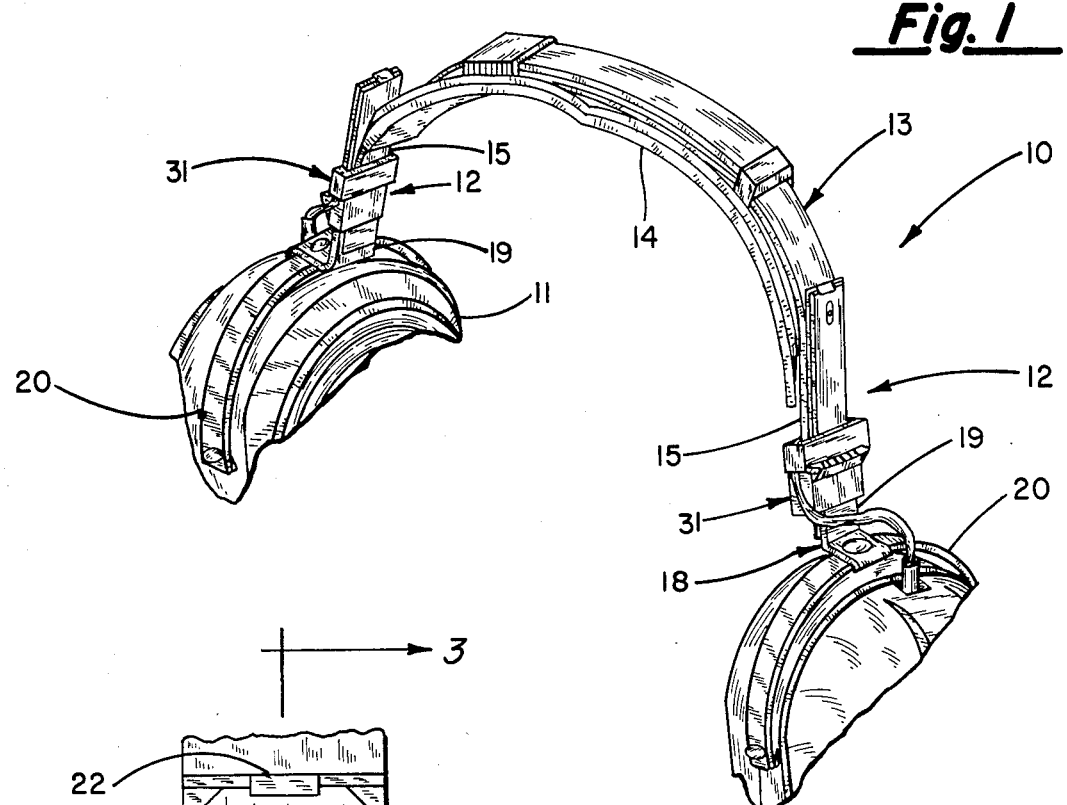
FIG. 1 is a perspective fragmentary sketch of a headset embodying the principles of my invention.
Figure 2:
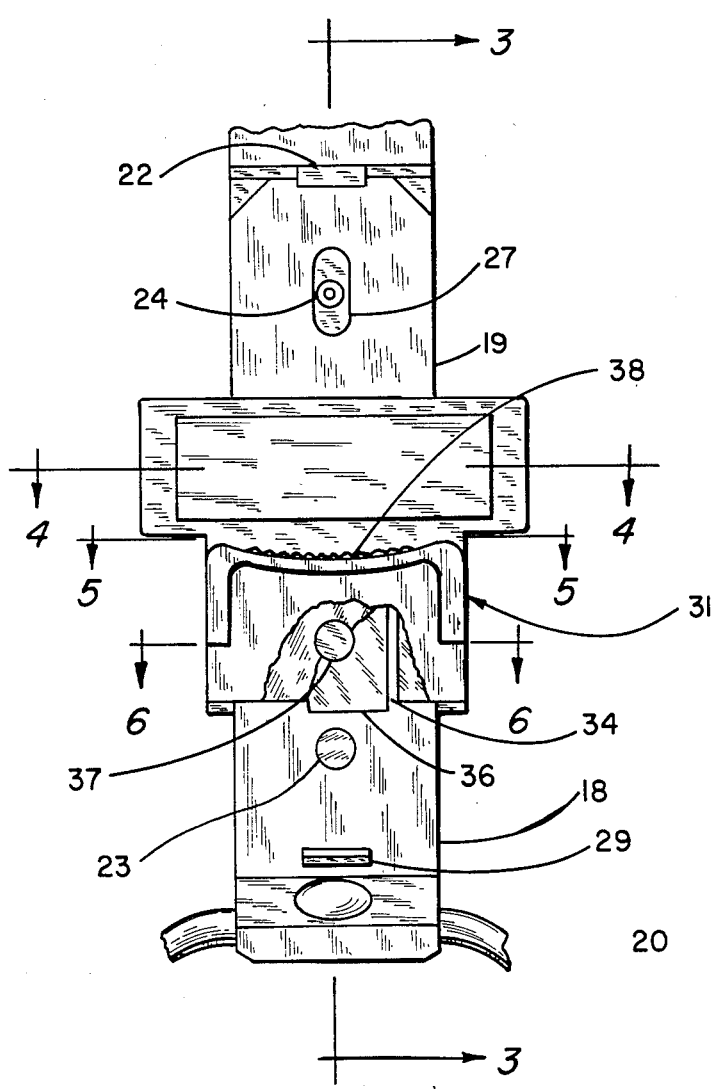
FIG. 2 is an enlarged fragmentary front elevational view of my invention.
Figure 4:
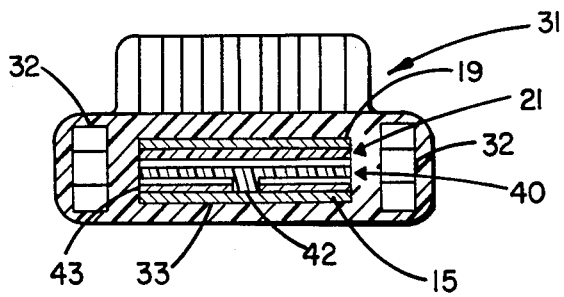
FIG. 4 is a sectional view taken along section line 4—4 on FIG. 2.
Figure 5:
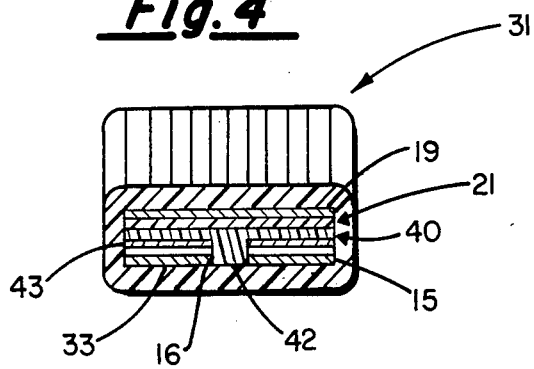
FIG. 5 is a sectional view taken along section line 5—5 on FIG. 2.

Referring to the drawings in which like elements have been identified by like reference characters, FIG. 1 shows headset 10 having a pair of earcups 11 disposed upon a mounting suspension indicated generally by reference character 12 that is mounted upon the lower ends of a generally "C" shaped headband 13.

Headband 13 is of generally rectangular cross section and includes a center portion 14 and a pair of downwardly depending ends 15, each having a pair of circular apertures 16 and 17 disposed adjacent the lower end.

Mounting suspension 12 includes an earcup support indicated generally by reference character 18 comprised of a flat generally vertical portion 19 of rectangular cross section that is attached at its lower end, as by a rivet, to a transversely extending downwardly opening "C" shaped frame 20 that is pivotally connected to the sides of earcups 11. Vertical portion 19 is provided with vertically spaced apart apertures 27, 28, and 29 for receiving and mounting a rack element, indicated generally by reference character 21.

Detenting rack member 21 is shown having rearwardly extending ear portions 22 and 23 at the top and bottom ends, a pair of vertically spaced apart rearwardly extending boss-members 24 and 25 and a plurality of frontwardly extending rack teeth 26 extending laterally in vertical spaced apart relationship.

An adjustment housing 31 is shown disposed on the lower ends of headband 13 and includes a pair of vertically oriented side slots 32 for receiving and retaining electrical cordage as may be required and a center slot 33 for stationary disposition on the bottom ends 15 of headband 13 and for slidably receiving vertical portion 19 of earcup support 18. Housing 31 is provided with slits 34 and 35 adjacent its bottom inner surface to define a retractable center section 36 that is provided with an inwardly extending boss 37 for engagement with aperture 17 in the lower ends 15 of headband 13. Housing 31 is also provided with a finger grip 38 extending forwardly from the outer major surface.

Figure 3:
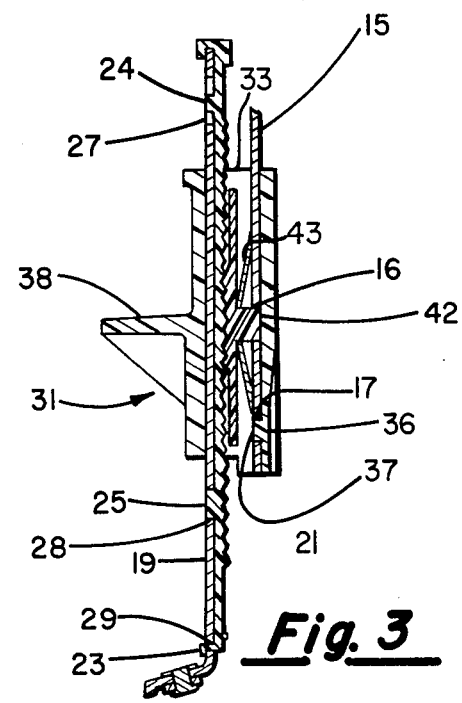
FIG. 3 is a sectional view taken along section 3—3 on FIG. 2.
Figure 6:
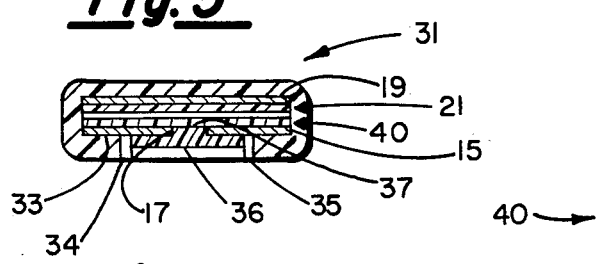
FIG. 6 is a sectional view taken along section line 6—6 on FIG. 2.
Figures 9, 10:
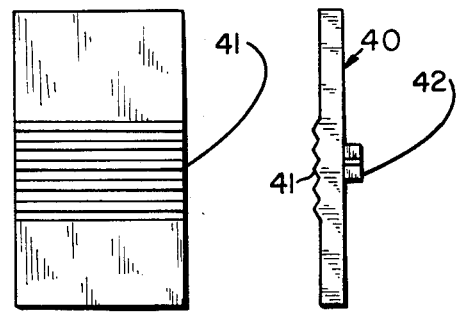
FIG. 9 is a front elevational view of another of the elements of my invention.
FIG. 10 is a side elevational view of the element of FIG. 9.
Figures 7, 8:
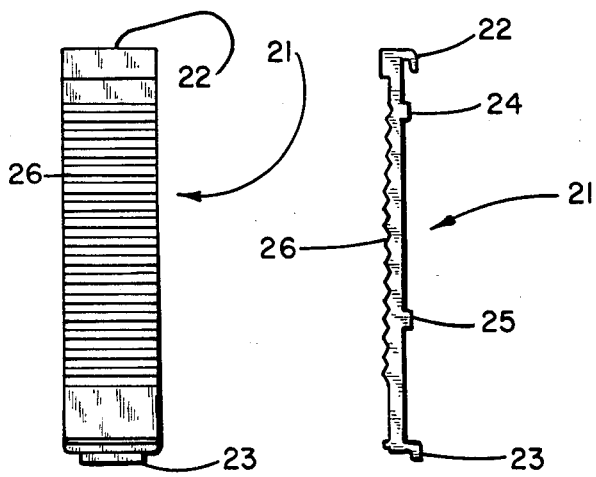
FIG. 7 is a front elevational view of one of the elements of my invention.
FIG. 8 is a side elevational view of the element of FIG. 7.
Figures 11, 12:
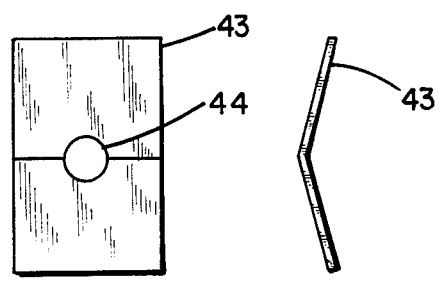
FIG. 11 is a front elevational view of another of the elements of my invention.
FIG. 12 is a side elevational view of the element of FIG. 11.

A rachet detent 40, having a plurality of transversely extending rack teeth 41 on its front surface and a boss 42 extending rearwardly into a aperture 16 on headband 13, and a biasing spring 43 having a wide V shaped cross section and an aperture 44 disposed on boss 42 on rachet detent 40, are stationarily disposed within slot 33 as illustrated in FIG. 3 of the drawings.

Headband 13 is typically comprised of a flat, elongated member exhibiting resiliency or spring-like characteristics such that the lower portions or ends 15 will exert an inward force toward the opposite sides of a user's head and may be comprised of suitable plastic or metallic material. Vertical portion 19 of earcup support assembly 18 and the "C" shaped pivot 20 are comprised of rigid material such as steel or suitable plastics and earcups 11 are rotatably disposed about the lower ends of "C" pivot member 20 for rotation about an axis extending therethrough and perpendicular to the longitudinal axis of vertical portion 19.

Housing 31 may be comprised of suitable rigid material exhibiting resiliency characteristics over the portion from which center rear section 36 depends and such materials may include metallic or plasics. Similarly, detenting rack 21 and detenting rachet 40 may also be comprised of rigid metallic or plastic materials and it is not necessary that the aforementioned elements be comprised of the same material. Detenting rachet spring 43 is preferably comprised of resilient metallic material.

The assembly of my improved adjustable earcup suspension is easily accomplished by assembling detenting rack 21 to the inside surface of the longitudinally elongated vertical portion 19 of earcup support 18 by inserting ear 23 in aperture 29, bosses 24 and 25 in apertures 27 and 28, and disposing ears 22 over the top portion thereof. The assembly is then inserted upwardly into slot 33 in housing 31. Boss 42 on racheting detent 40 is inserted through aperture 44 in detenting spring 43 and into aperture 16 in the lower end 15 of headband 13 and downwardly into slot 33 in housing 31 so that detenting rack 41 is in engagement with rack teeth 26 on detenting rack 21 in face-to-face relationship and, as end 15 is inserted downwardly into slot 33, rear center portion 36 of housing 31 is deflected rearwardly until boss 37 is in alignment with aperture 17 in headband end 15 at which point the assembly is completed as boss 37 moves into aperture 17 to stationarily mount housing 31 on end 15 of headband 13.

When an operator receives a headset 12 that is not adjusted to place the earcups over the ears in the desired operating position, earcup supports 18 may be moved to either extreme of the limits of travel and the unit initially placed in general operating position on the head of the operator with the headband in engagement with the top of the head. The operator may then grasp finger-grips 38 on housings 31 while moving earcups 11 up and down to thereby move vertical portions 19, carrying racks 21, with respect to housing 31 and as this movement occurs, detenting rachet 40 will retract laterally away from rack 21 to permit the movement but allow the operator to feel the movement and to provide increments of adjustability in one direction or the other. Once the suitable, or desired, position is attained, earcups 11 will be retained in that position of adjustment without further attention with rack 41 on detent rachet 40 in locking engagement with the rack teeth 26 on detenting rack 21.

I claim:

1. In a headset including a headband having at least one lower end and an earcup depending therefrom, vertical adjustment apparatus comprising in combination;
    a housing having a vertically disposed slot, stationarily mounted on the lower end of a headphone headband;
    earcup mounting means having a vertically extending member, vertically, slidably disposed in said slot and including an inwardly facing rack; and
    detenting means, including an inwardly extending rack having at least two teeth disposed on a rearwardly extending portion stationarily disposed in said slot and in facing engagement with said rack.

2. The subject matter of claim 1 in which biasing means are disposed intermediate the rearwardly extending portion of the detenting means and an inner portion of the slot in the housing.

3. The subject matter of claim 2 in which the biasing means is comprised of a V shaped spring.

4. The subject matter of claim 3 in which the headband includes an aperture adjacent the lower end and the housing includes a rectractable locking member adapted to removeably engage the aperture.

5. The subject matter of claim 4 in which the rack is comprised of a longitudinally elongated member having a plurality of laterally extending, spaced apart teeth stationarily disposed on the inner surface of the vertically extending member on the earcup mounting means.

6. The subject matter of claim 5 in which the top of the rack extends over the top of the vertically extending member on the earcup mounting means.

7. In a headset including a headband having at least one lower end and an earcup depending therefrom, vertical adjustment apparatus comprising in combination;
    a housing, having a vertically disposed slot, stationarily mounted on the lower end of a microphone headband, said headband including an aperture adjacent the lower end thereof and said housing, including a retractable locking member comprised of parallel, longitudinal slots in one major surface thereof, extending upwardly from the lower end of said housing, and adapted to removably engage said aperture;
    earcup mounting means, including a vertically extending member, vertically, slidably disposed in said slot and including an inwardly facing rack; and
    detenting means disposed in said slot and in facing engagement with said rack.

8. The subject matter of claim 7 in which the locking member includes an inwardly extending boss adjacent the lower end and dimensioned to slidably engage the aperture in the headband.

9. In a headset including a headband having at least one lower end and an ear cup depending therefrom, vertical adjustment apparatus comprising in combination;
    a housing, having a vertically disposed slot, stationarily mounted on the lower end of a headphone headband;
    earcup mounting means, having a vertically extending member, vertically, slidably disposed in said slot and including an inwardly facing rack comprised of a longitudinally elongated member having a plurality of laterally extending, spaced apart teeth stationarily disposed on the inner surface of the vertically extending member on said earcup mounting means and including a plurality of rearwardly extending portions adapted to engage the vertically extending member on said earcup mounting means; and detenting means disposed in said slot and in facing engagement with said rack.

10. The subject matter of claim 9 in which the vertically extending member on the earcup mounting means includes a plurality of vertically spaced apart apertures for lockable engagement of the rearwardly extending portions of the rack.

11. The subject matter of claim 10 in which the top of the rack extends over the top of the vertically extending member on the earcup mounting means.

* * * * *